(12) United States Patent
Nakai et al.

(10) Patent No.: US 6,587,131 B1
(45) Date of Patent: Jul. 1, 2003

(54) METHOD FOR ASSISTING USER TO OPERATE POINTER

(75) Inventors: Haruhiko Nakai, Kawasaki (JP); Yohsuke Kinoe, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 392 days.

(21) Appl. No.: 09/587,507

(22) Filed: Jun. 5, 2000

(30) Foreign Application Priority Data

Jun. 4, 1999 (JP) .......................................... 11-157347

(51) Int. Cl.⁷ ................................................ G09G 5/00
(52) U.S. Cl. ........................................ 345/857; 345/862
(58) Field of Search ............................... 345/856–862, 345/865, 157

(56) References Cited

U.S. PATENT DOCUMENTS

| | | | | |
|---|---|---|---|---|
| 4,847,605 A | * | 7/1989 | Callahan et al. | 345/856 |
| 4,987,411 A | * | 1/1991 | Ishigami | 345/159 |
| 5,298,890 A | * | 3/1994 | Kanamaru et al. | 345/157 |
| 5,736,974 A | * | 4/1998 | Selker | 345/862 |
| 5,757,358 A | * | 5/1998 | Osga | 345/862 |
| 5,808,601 A | * | 9/1998 | Leah et al. | 345/856 |
| 5,808,604 A | * | 9/1998 | Robin | 345/862 |
| 5,870,079 A | * | 2/1999 | Hennessy | 345/159 |
| 5,917,486 A | * | 6/1999 | Rylander | 345/764 |
| 6,046,722 A | * | 4/2000 | McKiel, Jr. | 345/862 |
| 6,049,326 A | * | 4/2000 | Beyda et al. | 345/157 |
| 6,075,531 A | * | 6/2000 | DeStefano | 345/788 |
| 6,137,472 A | * | 10/2000 | Pekelney et al. | 345/858 |
| 6,362,842 B1 | * | 3/2002 | Tahara et al. | 345/856 |

FOREIGN PATENT DOCUMENTS

| | | | |
|---|---|---|---|
| JP | 403048922 A | * | 3/1991 |
| JP | 404238524 A | * | 8/1992 |
| JP | 405298023 A | * | 11/1993 |

\* cited by examiner

*Primary Examiner*—Sy D. Luu
(74) *Attorney, Agent, or Firm*—David M. Shofi; Anne Vachon Dougherty

(57) ABSTRACT

A system and method for assisting the user to operate a pointer so as to move the pointer onto a desired object by the pointing device. A pointer movement direction in which the user wants to move the pointer is detected in accordance with a movement of the pointer by the pointing device (Step S2). Candidate objects located within a predetermined range of the pointer movement direction are displayed (Step S3). The object is selected from the displayed candidate objects (Step S4). The pointer is moved onto the selected object (Step S5).

15 Claims, 4 Drawing Sheets

OBJECT TABLE

|  | OBJECT 1 | OBJECT 2 | ... | OBJECT n |
|---|---|---|---|---|
| OBJECT IDENTIFIER | AAAAA | BBBBB |  | ZZZZZ |
| PRIORITY(0–9) | 9 (Highest) | 1 (Lowest) |  | 0 (Disabled) |
| LOWER LEFT AND UPPER RIGHT COORDINATES IN AREA | – | – | – | – |
|  | – | – | – | – |
| ACTUAL AREA | – | – | – | – |
| x 1 | 200.0 | ... | ... | ... |
| y 1 | 150.0 | ... | ... | ... |
| x 2 | 210.0 | ... | ... | ... |
| y 2 | 160.0 | ... | ... | ... |
| DUMMY AREA |  | – | – | – |
| x 1 | 180.0 | ... | ... | ... |
| y 1 | 140.0 | ... | ... | ... |
| x 2 | 220.0 | ... | ... | ... |
| y 2 | 180.0 | ... | ... | ... |
| DIRECTION DROM REFERENCE POINT |  | – | – | – |
| θ 1 |  |  |  |  |
| θ 2 |  |  |  |  |
| DISTANCE FROM REFERENCE POINT |  |  |  |  |

METHOD FOR ASSISTING USER TO OPERATE POINTER

FIELD OF THE INVENTION

The present invention relates to a method for assisting a user to operate a pointer so as to move the pointer onto a desired object by a pointing device. More particularly, this invention relates to a method for assisting a user to operate a pointer, which is suitable for a physically handicapped person and an aged person.

BACKGROUND OF THE INVENTION

A pointing device such as a mouse and a keyboard are used as a main and basic input device of a PC (Personal Computer). The pointing device very naturally serves as an interface via which a user moves a pointer on a display. Thus, the pointing device is clearly superior to the keyboard. It is thus considered that the user uses the pointing device when the user uses the pointer, except for the case in which the pointing device is not connected to the PC. However, there is a problem as described below. Although an able-bodied person has no difficulty in operating the pointing device, this operation of the pointing device is more difficult than the keyboard operation for a person who is handicapped in his/her arm because of an injury or a disease and an aged person whose physical functions are generally degraded because of an advanced age.

Herein, a motion of the arm and fingers for the pointing device is compared to the motion for the keyboard. The result of comparison is as follows. For the keyboard, one keystroke typically takes place in the following manner (the following steps 1, 2 and 6 are unnecessary when Shift/Alt/Ctrl keys are not used).

Step 1: Put the fingers on the Shift/Alt/Ctrl keys (Use two keys such as the Alt/Ctrl keys in some cases).

Step 2: Press the Shift/Alt/Ctrl keys.

Step 3: Put another finger on a specific key.

Step 4: Press the specific key.

Step 5: Move the finger off the specific key.

Step 6: Move the fingers off the Shift/Alt/Ctrl keys.

It may be said that the motion of the fingers and the arm for the keystroke comprises three elements as described below:

A. Put the finger on a specific position on the keyboard,

B. Press the key with the finger, and

C. Move the finger off the key.

For example, the operation to drag and drop the mouse (a typical pointing device) is as follows.

Step 1: Hold the mouse.

Step 2: Move the mouse on a display screen so that the pointer is moved toward an object to be dragged.

Step 3: Raise the mouse and place the mouse on a place where the mouse is easily moved, when a space to move the mouse is insufficient.

Step 4: Press a mouse button when the pointer reaches the object to be dragged.

Step 5: Move the mouse so that the pointer is moved toward a destination of the object.

Step 6: While pressing the button, raise the mouse and place the mouse on the place where the mouse is easily moved, when the space to move the mouse is insufficient.

Step 7: Move the finger off the button when the pointer reaches the destination of the object.

As can be seen from the above comparison, the mouse operation does not differ much from the keyboard operation in Steps 1, 4 and 7 from a viewpoint of a motional function. However, the more complicated hand motion is required for Steps 2, 3, 4 and 6. Some pointing devices, such as the pointing device for a portable PC, are fixedly positioned differently from the mouse. These pointing devices do not need Steps 3 and 6. Also for such a pointing device, Steps 2 and 5 require the hand motion which is less necessary than the motion for the mouse but is unnecessary for the keyboard operation. This makes it difficult for the handicapped person and the aged person to use the pointing device. Moreover, in some cases, the pointer must be moved onto a small object. This also makes it difficult for the handicapped person and the aged person to use the pointing device.

On the other hand, techniques disclosed in Japanese Patent Publication No. 3-48922, No. 4-238524 and No. 5-298023 are known as a meth od of facilitating the operation of pointing to the object in accordance with a movement of the pointer by operating the pointing device. In any of these techniques, which object the user wants to select is first speculated in accordance with the movement of the pointer. Then, the pointer is forced to be moved onto the object at a certain timing (Japanese Patent Publication No. 3-48922 and No. 4-238524), or processing equivalent to a selection of the object is performed (Japanese Patent Publication No. 5-298023), whereby these techniques intend to improve efficiency of the user pointer operation. However, in any of these examples, it is assumed that the position of the pointer continues to move toward an icon in order to select the object. It is possible to expect that a typical user (the able-bodied person) moves the pointer in this manner. However, it is impossible to expect that the user who is handicapped in his/her hand and arm or the like moves the pointer in this manner.

It is an object of the present invention to provide a method for assisting the user to operate the pointer, which solves the above problems and enables even the person who is handicapped in his/her hand and arm and the aged person to select the object by operating the pointer by means of the pointing device.

SUMMARY OF THE INVENTION

The foregoing and other objects are realized by the present invention comprising a method for assisting a user to operate a pointer so as to move the pointer onto a desired object by a pointing device. This method comprises the steps of detecting a pointer movement direction in which the user wants to move the pointer, in accordance with a movement of the pointer by the pointing device; displaying candidate objects. located within a predetermined range of the pointer movement direction; and selecting the object from the displayed candidate objects.

In the present invention, the above-described constitution enables the pointer to be moved onto a distant object without indicating which route is followed by the pointer until the pointer reaches the object. The pointing device is merely used in order to indicate the direction to the object. In other words, an operation of the pointer by the pointing device can be minimized. Thus, this method can greatly simplify and reduce the operation of the pointer by the pointing device, compared to the continuous movement of the pointer from a starting point to an end point. Therefore, even a person who is handicapped in his/her hand and arm and an aged person can select the object by operating the pointer by means of the pointing device.

In a particular preferred embodiment of the present invention, the method is used by switching between an active state in which a system for implementing the assisting method is on and an inactive state in which the system for implementing the assisting method is off. The method for assisting the user to operate the pointer of the present invention is typically used for "a remote movement" of the pointer. The switching takes place in order that the user can select the state, because the pointer can be often moved onto an adjacent object without use of the present method.

In another preferred embodiment of the detection of the pointer movement direction and the display of the candidate objects, the pointer movement direction is detected by use of a direction indicator comprising two large and small concentric circles around a reference point which is a position of the pointer when the system for implementing the assisting method enters the active state. In this case, the pointer is moved over a short distance from the reference point, and the following processing (a) through (c) are executed in accordance with which part of the direction indicator the pointer is located.

(a) When the pointer is located in the small concentric circle ("an area where a vector is not displayed"):

no processing is executed except that the position of the pointer is checked.

(b) When the pointer is located between the small and large concentric circles (in "a vector display area"):

the direction of a straight line connecting the reference point and the pointer is used as the pointer movement direction, "a movement direction vector" indicating the pointer movement direction is displayed, "a preceding pointer" is set on one of the candidate objects located within a predetermined range with respect to the movement direction vector, and "an object display index" having any one of numbers 1 to 9 is set on the candidate objects other than the object on which the preceding pointer is set.

(c) When the pointer is located outside the large concentric circle:

the system for implementing the assisting method is inactivated.

In this manner, the pointer movement direction is detected and the candidate objects are displayed. In the above-described constitution, the pointing device is moved over a short distance, whereby the pointer movement direction can be detected and furthermore the candidate objects can be displayed.

In still another preferred embodiment, the preceding pointer is set on the object of the candidate objects which is closest to the movement direction vector. Moreover, the object display indexes having the numbers 1 to 9 are set on the candidate objects other than the object on which the preceding pointer is set, from the closest candidate object to the movement direction vector to the farthest candidate object from the movement direction vector. By this constitution, the preceding pointer and the object display indexes can be set in order of priority of the object which the user wants to select. Furthermore, the following operation is executed in order to display 10 candidate objects or more. First, the preceding pointer and the object display indexes are set on the 10 candidate objects so that the 10 candidate objects are displayed. Then, when the object to be selected is not included in the displayed candidate objects, a predetermined key is pressed, whereby the preceding pointer and the object display indexes are set on 10 next candidate objects so that the 10 next candidate objects are displayed. From then on, the above operation is repeated until all the candidate objects are displayed, whereby a predetermined object is selected. This can facilitate the display operation.

In a further preferred embodiment of the selection of the object, the object on which the preceding pointer is set is selected by clicking the pointing device. Furthermore, the object on which the object display index is set is selected by keying the number of the object display index. By this constitution, even the person who is handicapped in his/her hand and arm and the aged person can easily select the object.

DETAILED DESCRIPTION OF THE INVENTION

Figure 1:
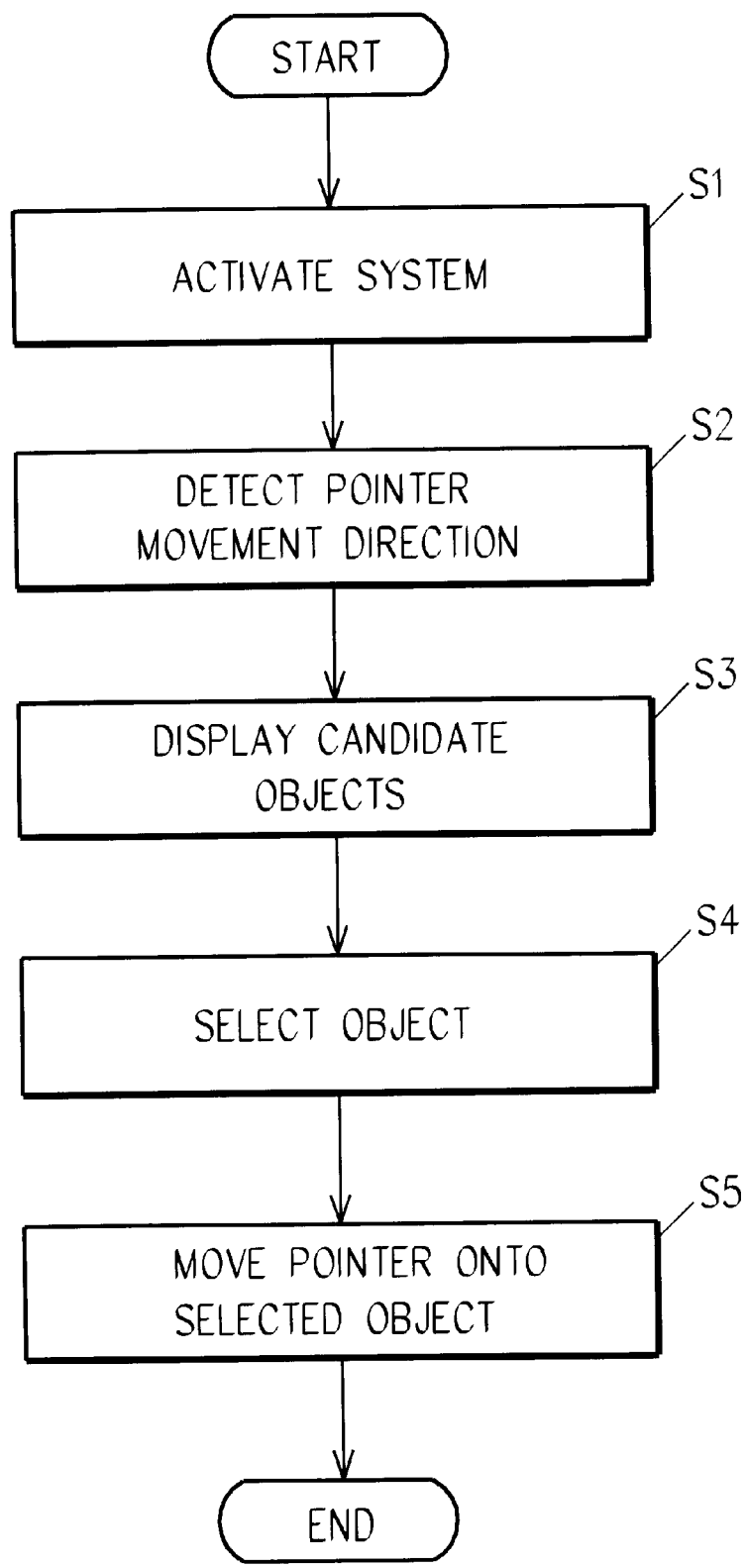
FIG. 1 is a flowchart of one example of a method for assisting a user to operate a pointer of the present invention.

FIG. 1 is a flowchart of one example of a method for assisting a user to operate a pointer of the present invention. The method for assisting the user to operate the pointer of the present invention will be described with reference to FIG. 1. First, a system for implementing the assisting method is activated (Step S1). After the system for implementing the assisting method enters an active state, a pointer movement direction in which the user wants to move the pointer is detected in accordance with a movement of the pointer by a pointing device (Step S2). Then, candidate objects located within a predetermined range of the detected pointer movement direction are displayed (Step S3). Then, the object is selected from the displayed candidate objects (Step S4). Finally, the pointer is moved onto the selected object (Step S5).

Figures 2, 3:
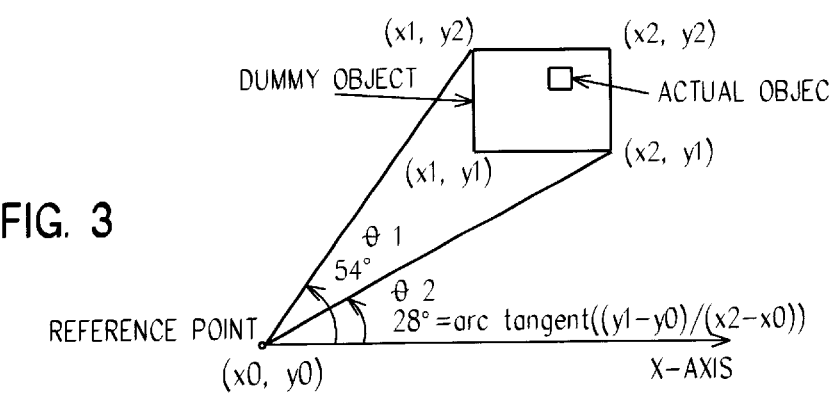
FIG. 2 is a table showing a structure of one example of an object table for use in the present invention.
FIG. 3 shows a relationship among a reference point, a dummy object and an actual object for use in the present invention.

Each of the above-described steps of the present invention will be described below. Information on a position of the object which is a destination of the pointer will be first described before the description of each step. In the present invention, the information on the positions of about ten objects (e.g., icons) which can be the destination of the pointer, a priority of the objects, etc. are recorded in an object table. FIG. 2 is a table showing a structure of one example of the object table for use in the present invention. In the example shown in FIG. 2, the object table has an object 1, . . . , an object n, and these objects have different object identifiers. The priority means a frequency with which the user selects the object. The priorities are indicated by numbers 0 to 9. The highest priority is indicated by 9 and the lowest priority is indicated by 1. The disabled object is indicated by 0. This priority varies whenever processing is changed. The object table is created for each processing, or a value of the priority is updated for each processing. It is assumed that each object can be regarded as a rectangle on a display screen. The position and size of the object are represented as coordinates (x1, y1) and (x2, y2) of lower left and upper right vertexes of the object. There are two sets of values: one set of values representing an actual object and the other set of values representing a dummy object. How the actual object and the dummy object are used will be described below. Also, the object table has fields for a direction from a reference point and a distance from the reference point. Every time the system for implementing the assisting method enters the active state, the direction and distance from the reference point are calculated for each object. Then, the direction and distance from the reference point are recorded in the object table. Then, the direction and distance from the reference point are used to display the candidate objects as described below.

In Step S1, the system for implementing the assisting method is activated. The method for assisting the user to operate the pointer of the present invention is typically used for a remote movement of the pointer. The system is not always kept active, because the pointer can be often moved onto an adjacent object without use of the present method. The user presses a specific key or a specific combination of keys (the key for activating the system for assisting the user to operate the pointer), whereby the system for implementing the assisting method can be explicitly started. Also when the pointer is stationary for a predetermined time period (e.g., 5 sec) or longer in a background area (an area other than the area where the object is displayed on the display screen), the system for implementing the assisting method is automatically activated and started.

In Step S2, the pointer movement direction is detected. In Step S3, the candidate objects are displayed. First, before Step S2, the following processing (a) and (b) are performed at the time when the system for implementing the assisting method is activated.

(a) A current position of the pointer is taken as the reference point.

(b) The direction and distance from the reference point are calculated for each object, and the calculated direction and distance are recorded in the object table.

1) The direction from the reference point:

Two angles θ1 and θ2 are calculated (where an inclination of an x-axis is assumed as 0□□), where the angles θ1 and θ2 indicate in which direction the dummy object is located with respect to the reference point. Even if the actual object is small, increasing the size of the dummy object makes it easy for the user to select the object. When the reference point is located outside the actual object but within a dummy area, the angles θ1 and θ2 of the actual object are calculated and recorded.

2) The distance from the reference point:

The distance from the reference point to a center of the rectangle corresponding to the actual object is calculated. The calculated distance is considered as the distance from the reference point.

When the reference point is located within the actual object, all these three numerical values are set to 0. FIG. 3 shows a relationship among the reference point, the dummy object and the actual object for use in the present invention.

Next, a direction indicator is displayed. The direction indicator comprises two large and small concentric circles around the reference point. The direction indicator is an opaque graphic which is additionally displayed on the graphics which have been displayed so far on the display screen. In an initial state, the pointer points to the center of the direction indicator (the reference point). In fact, the small and large concentric circles have a radius of about 7 mm and about 1 cm, respectively, on a 15-inch display. In this method, which part of the direction indicator the pointer is located is detected. Then, the following processing (a) through (c) are executed.

(a) When the pointer is located in the small concentric circle ("an area where a vector is not displayed"):
no processing is executed except that the position of the pointer is checked.

(b) When the pointer is located between the small and large concentric circles (in "a vector display area"):
the direction of a straight line connecting the reference point and the pointer is used as the pointer movement direction, "a movement direction vector" indicating the pointer movement direction is displayed, "a preceding pointer" is set on one of the candidate objects located within a predetermined range with respect to the movement direction vector, and "an object display index" having any one of numbers 1 to 9 is set on the candidate objects other than the object on which the preceding pointer is set.

(c) When the pointer is located outside the large concentric circle:
the system for implementing the assisting method is inactivated.

Figure 4:
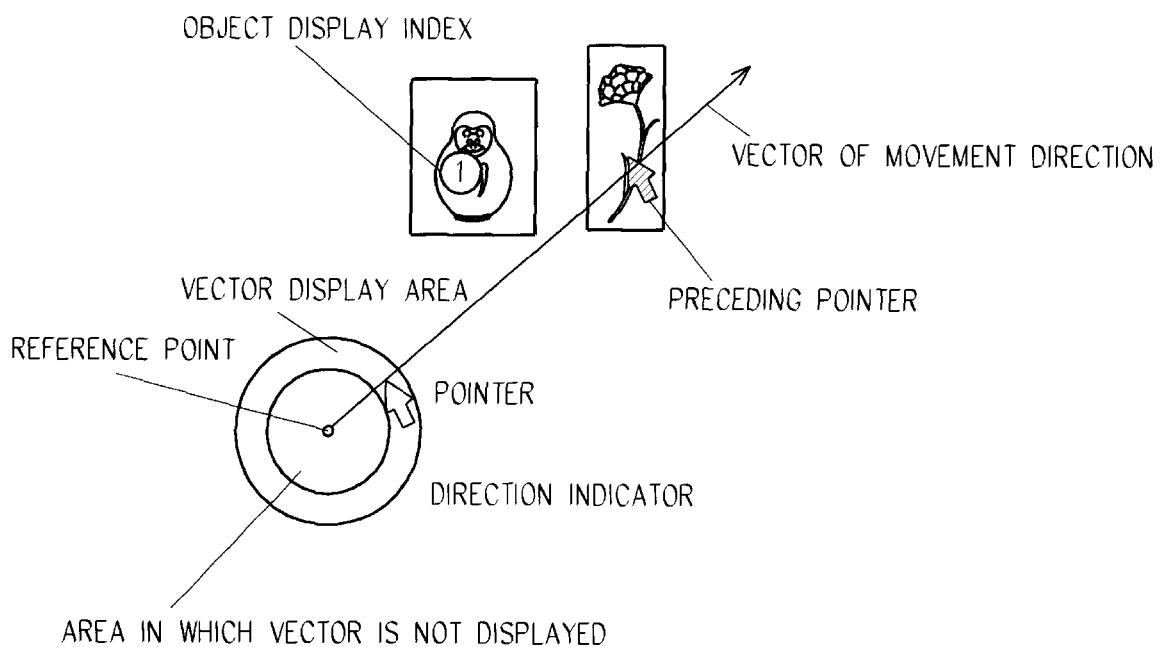
FIG. 4 shows a relationship among a direction indicator, a movement direction vector, a preceding pointer and an object display index for use in the present invention.

FIG. 4 shows a relationship among the direction indicator, the movement direction vector, the preceding pointer and the object display index for use in the present invention. The pointer is moved to the direction indicator by moving the pointer toward the object onto which the user wants to move the pointer. That is, the user positions the pointer on the direction indicator and the user moves the pointer over a short distance from the reference point to the vector display area, whereby the pointer movement direction is indicated. When the reference point is far from the object which the user wants to point to, the user may be unable to move the pointer so as to correctly point to the object. Thus, a plurality of candidate objects are used. First, the movement direction vector is displayed in order that the user can check the movement direction indicated by the user. The movement direction vector extends from the reference point toward the pointer and leads to an end of the display screen. The user changes the position of the pointer in the vector display area, whereby the user can also correct the movement direction. All the objects, which include the dummy objects within a predetermined range with respect to the movement direction vector, e.g., within a range of ±10° with respect to the reference point, are regarded as the candidate objects. The direction from the reference point in the object table is used in order to determine these candidate objects. A condition that the object close to the reference point is not regarded as the candidate object may be provided. In this case, the distance from the reference point is also used. These candidate objects are regarded as the objects which the user may select. When the user wants to use other element besides the distance with respect to the movement direction vector in order to determine the order of priority of the candidate objects, the above-mentioned priority is used. For example, the object with the priority 9 is regarded as the candidate object, even if this object is outside the movement direction.

Figure 5:
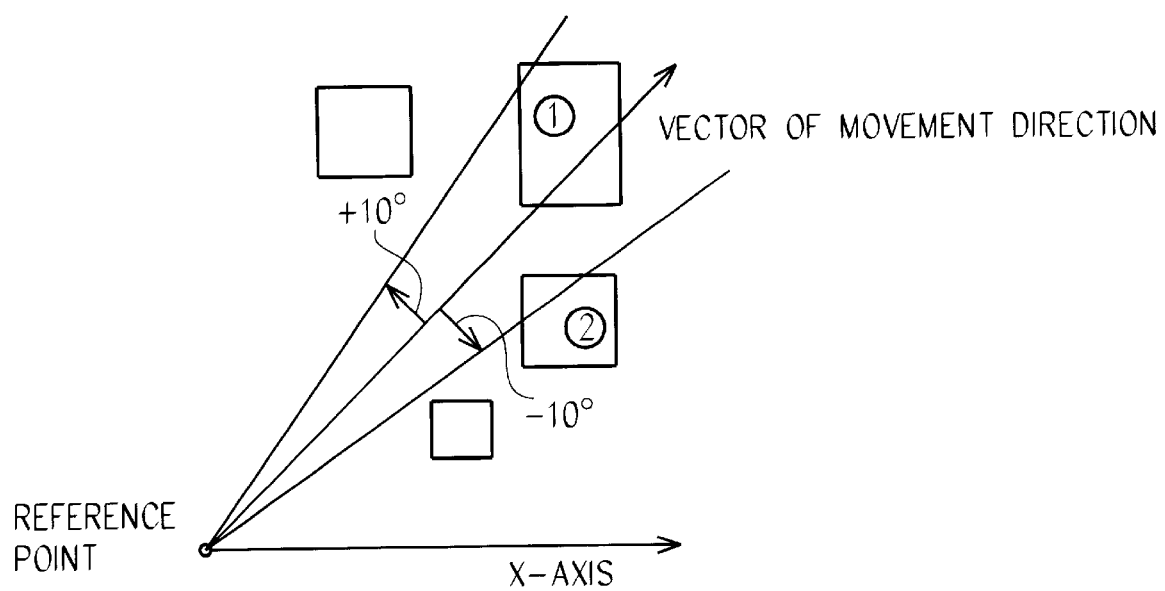
FIG. 5 shows an example of candidate objects on which object display indexes 1 and 2 are set, of the candidate objects for use in the present invention.

To display the candidate objects, the preceding pointer is set on one of the candidate objects. The object display indexes, each of them having any one of the numbers 1 to 9, are set on the candidate objects other than the object on which the preceding pointer is set. FIG. 5 shows an example of the candidate objects on which the object display indexes 1 and 2 are set, of the candidate objects for use in the present invention. Although the method of setting the preceding pointer and the object display indexes on the candidate objects is not limited, the following method is preferable in consideration of the fact that the movement direction vector is the direction in which the user wants to move the pointer. That is, the preceding pointer is set on the object of the candidate objects which is closest to the movement direction vector. The object display indexes having the numbers 1 to 9 are set on the candidate objects other than the object on which the preceding pointer is set, from the closest candidate object to the movement direction vector to the farthest candidate object from the movement direction vector. 10 candidate objects or more cannot be displayed by the above-described method alone. Preferably, the following method is applied to this case. First, the preceding pointer and the object display indexes are set on the 10 candidate objects so that the 10 candidate objects are displayed. Then, when the object to be selected is not included in the displayed candidate objects, a predetermined key is pressed, whereby the preceding pointer and the object display indexes are set on 10 next candidate objects so that the 10 next candidate objects are displayed. From then on, the above operation is repeated until all the candidate objects are displayed.

In Step S4, the object is selected from the candidate objects. In this case, the user clicks the pointing device, whereby the user can select the object located on the position which the preceding pointer points to. Moreover, the user uses a ten-key pad to enter one number of the position indicated by the object display index, whereby the user can select a desired object. In the case of 10 candidate objects or more, the user presses 0 on the ten-key pad, whereby the next candidate objects are displayed. Finally, in Step S5, the pointer is moved onto the selected object. In this case, the user selects the object, whereby the pointer is set on the center of the selected object and the system for implementing the assisting method is inactivated. The inactivation means that the reference point is reset and that the direction indicator, the movement direction vector, the preceding pointer and the object display index are cleared.

As can be seen from the above description, according to the present invention, the pointer movement direction in which the user wants to move the pointer is detected in accordance with the movement of the pointer by the pointing device. The candidate objects located within a predetermined range of the pointer movement direction are displayed. The object is selected from the displayed candidate objects. The pointer is moved onto the selected object. This enables the pointer to be moved onto a distant object without indicating which route is followed by the pointer until the pointer reaches the object. The pointing device is merely used in order to indicate the direction to the object. In other words, the operation of the pointer by the pointing device can be minimized. Thus, this method can greatly simplify and reduce the operation of the pointer by the pointing device, compared to the continuous movement of the pointer from a starting point to an end point. Therefore, even the person who is handicapped in his/her hand and arm and the aged person can select the object by operating the pointer by means of the pointing device.

What is claimed is:

1. A method for assisting a user to operate a pointer so as to move said pointer onto a desired object by a pointing device, said method comprising the steps of:

detecting a pointer movement direction in which the user wants to move said pointer, in accordance with a movement of said pointer by said pointing device;

displaying candidate objects located within a predetermined range of said pointer movement direction; and selecting the object from said displayed candidate objects;

wherein said method is used by switching between an active state in which a system for implementing the assisting method is on and an inactive state in which said system for implementing the assisting method is off; and wherein said pointer movement direction is detected by use of a direction indicator comprising two large and small concentric circles around a reference point which is a position of said pointer when said system for implementing the assisting method enters said active state.

2. The method according to claim 1, wherein said pointer is moved over a short distance from said reference point, and the following processing (a) through (c) are executed in accordance with which part of said direction indicator said pointer is located:

(a) when said pointer is located in said small concentric circle comprising an area where a vector is not displayed no processing is executed except that the position of said pointer is checked;

(b) when said pointer is located in a vector display area between said small and large concentric circles the direction of a straight line connecting said reference point and said pointer is used as the pointer movement direction, a movement direction vector indicating said pointer movement direction is displayed; a preceding pointer is set on one of the candidate objects located within a predetermined range with respect to said movement direction vector; and an object display index having any one of numbers 1 to 9 is set on the candidate objects other than said object on which said preceding pointer is set; and (c) when said pointer is located outside said large concentric circle said system for implementing the assisting method is inactivated whereby said pointer movement direction is detected and said candidate objects are displayed in accordance with the above processing (a) through (c).

3. The method according to claim 2, wherein said preceding pointer is set on the object of said candidate objects which is closest to said movement direction vector.

4. The method according to claim 2, wherein said object display indexes having the numbers 1 to 9 are set on the candidate objects other than the object on which said preceding pointer is set, from the closest candidate object to said movement direction vector to the farthest candidate object from said movement direction vector.

5. The method according to claim 2, wherein the object on which said preceding pointer is set is selected by clicking said pointing device.

6. The method according to claim 2, wherein the object on which said object display index is set is selected by keying the number of said object display index.

7. The method according to claim 2, wherein the following operation is executed in order to display 10 candidate objects or more:

first, said preceding pointer and said object display indexes are set on the 10 candidate objects so that the 10 candidate objects are displayed;

when the object to be selected is not included in the displayed candidate objects, a predetermined key is pressed, whereby said preceding pointer and said object display indexes are set on 10 next candidate objects so that the 10 next candidate objects are displayed; and from then on, the above operation is repeated until all the candidate objects are displayed, whereby a predetermined object is selected.

8. Apparatus for providing a method for assisting a user to operate a pointer so as to move said pointer onto a desired object, wherein said method is used by switching between an active state in which a system for implementing the assisting method is on and an inactive state in which said system for implementing the assisting method is off, comprising:

a pointing device;

a component for detecting a pointer movement direction of said pointing device wherein said pointer movement direction is detected by use of a direction indicator comprising two large and small concentric circles around a reference point which is a position of said pointer when said system for implementing the assisting method enters said active state;

a display generating component for displaying candidate objects located within a predetermined range of said pointer movement direction; and user input device for receiving selection input from said user of at least one of said candidate objects.

9. A program storage device readable by machine, tangibly embodying a program of instructions executable by the machine to perform method steps for assisting a user to operate a pointer so as to move said pointer onto a desired object by a pointing device, said method steps comprising:

detecting a pointer movement direction in which the user wants to move said pointer, in accordance with a movement of said pointer by said pointing device;

displaying candidate objects located within a predetermined range of said pointer movement direction; and selecting the object from said displayed candidate objects;

wherein said method is used by switching between an active state in which a system for implementing the assisting method is on and an inactive state in which said system for implementing the assisting method is off; and wherein said pointer movement direction is detected by use of a direction indicator comprising two large and small concentric circles around a reference point which is a position of said pointer when said system for implementing the assisting method enters said active state.

10. The device according to claim 9, wherein said pointer is moved over a short distance from said reference point, and the following processing (a) through (c) are executed in accordance with which part of said direction indicator said pointer is located:

(a) when said pointer is located in said small concentric circle comprising an area where a vector is not displayed no processing is executed except that the position of said pointer is checked;

(b) when said pointer is located in a vector display area between said small and large concentric circles the direction of a straight line connecting said reference point and said pointer is used as the pointer movement direction, a movement direction vector indicating said pointer movement direction is displayed; a preceding pointer is set on one of the candidate objects located within a predetermined range with respect to said movement direction vector; and an object display index having any one of numbers 1 to 9 is set on the candidate objects other than said object on which said preceding pointer is set; and (c) when said pointer is located outside said large concentric circle, said system for implementing the assisting method is inactivated whereby said pointer movement direction is detected and said candidate objects are displayed in accordance with the above processing (a) through (c).

11. The device according to claim 10, wherein said preceding pointer is set on the object of said candidate objects which is closest to said movement direction vector.

12. The device according to claim 10, wherein said object display indexes having the numbers 1 to 9 are set on the candidate objects other than the object on which said preceding pointer is set, from the closest candidate object to said movement direction vector to the farthest candidate object from said movement direction vector.

13. The device according to claim 10, wherein the object on which said preceding pointer is set is selected by clicking said pointing device.

14. The device according to claim 10, wherein the object on which said object display index is set is selected by keying the number of said object display index.

15. The device according to claim 10, wherein the following operation is executed in order to display 10 candidate objects or more:

first, said preceding pointer and said object display indexes are set on the 10 candidate objects so that the 10 candidate objects are displayed;

when the object to be selected is not included in the displayed candidate objects, a predetermined key is pressed, whereby said preceding pointer and said object display indexes are set on 10 next candidate objects so that the 10 next candidate objects are displayed; and from then on, the above operation is repeated until all the candidate objects are displayed, whereby a predetermined object is selected.

* * * * *